(12) United States Patent
Newcomb

(10) Patent No.: US 8,066,163 B2
(45) Date of Patent: Nov. 29, 2011

(54) GAME MOVER

(76) Inventor: John C. Newcomb, Sanford, MI (US)

( * ) Notice: Subject to any disclaimer, the term of this patent is extended or adjusted under 35 U.S.C. 154(b) by 1584 days.

(21) Appl. No.: 11/106,107

(22) Filed: Apr. 14, 2005

(65) Prior Publication Data

US 2006/0237507 A1    Oct. 26, 2006

(51) Int. Cl.
*B62B 15/00* (2006.01)
(52) U.S. Cl. .......................... 224/576; 224/921; 280/19
(58) Field of Classification Search .................. 224/576, 224/921, 184; 280/19; 5/627, 628
See application file for complete search history.

(56) References Cited

U.S. PATENT DOCUMENTS

| | | | | |
|---|---|---|---|---|
| 3,547,456 A * | 12/1970 | Sapp | ................................ | 280/19 |
| 3,674,188 A | 7/1972 | Anderson | | |
| 3,771,808 A * | 11/1973 | Duerst | ............................ | 280/19 |
| 4,283,068 A * | 8/1981 | Keyser | ............................ | 280/19 |
| 4,335,891 A * | 6/1982 | Alley et al. | ...................... | 280/19 |
| 4,442,557 A * | 4/1984 | Clemens | ............................ | 5/625 |
| 4,634,618 A * | 1/1987 | Greer et al. | ..................... | 428/81 |
| 4,802,602 A * | 2/1989 | Evans et al. | ................... | 220/739 |
| 4,887,823 A * | 12/1989 | Hallett et al. | .................. | 280/19 |
| 5,104,133 A * | 4/1992 | Reiner | ............................ | 280/19 |
| 5,211,434 A * | 5/1993 | Lanava | ......................... | 294/1.1 |
| 5,467,907 A | 11/1995 | Celik | | |
| 5,787,529 A * | 8/1998 | Landes | ............................ | 5/628 |
| 6,142,547 A * | 11/2000 | Bowerman | ..................... | 294/150 |
| 6,253,569 B1 * | 7/2001 | Hall | ............................. | 62/457.2 |
| 6,276,698 B1 * | 8/2001 | Calandra | ......................... | 280/19 |
| 6,393,638 B1 * | 5/2002 | MacColl | ........................... | 5/419 |
| 6,508,077 B1 * | 1/2003 | Vander Boegh et al. | ...... | 62/457.2 |
| 6,874,176 B2 * | 4/2005 | Berge | ............................ | 5/81.1 T |
| 6,889,882 B1 * | 5/2005 | Leep | ............................. | 224/579 |
| 2007/0235958 A1 * | 10/2007 | Small | .............................. | 280/19 |
| 2007/0236000 A1 * | 10/2007 | Small | .............................. | 280/845 |
| 2008/0018067 A1 * | 1/2008 | Small | .............................. | 280/19 |

* cited by examiner

*Primary Examiner* — Justin Larson

(57) ABSTRACT

A device for moving game after the game has been slain wherein the device acts as a sled or toboggan. A combination of the device is the device in a folded condition and inserted into a container for carrying the device. The container is a fabric bag with appropriate openings and straps for inserting the device and carrying the device, respectively.

8 Claims, 4 Drawing Sheets

GAME MOVER

The invention disclosed and claimed herein deals with a device for moving game after the game has been slain. A second embodiment of the invention is a combination of the device, in a folded condition, and inserted into a container for carrying the device.

BACKGROUND OF THE INVENTION

The invention is a device for moving game after it has been slain, and many such devices have been designed and used for such purposes. One such device is the "buck pole" device that is disclosed in U.S. Pat. No. 5,713,497, that issued on Feb. 3, 1998 to Ponczek in which there is shown a portable carrier for dead game which includes a tubular member that can be broken down into several components for transportation, but can be re-assembled in the woods to allow the transport of a deer. The device itself can be transported by one person, but the device requires two persons to effectively move the game.

For smaller game, devices such as are shown in U.S. Pat. No. 5,467,907, that issued on Nov. 21, 1993 to Celik, have been created. The pack is comprised of three panels, two mesh and one blood proof, sewn together with a suspension system and a drawstring for completeness. The device is obviously not useful for hauling large game, such as deer or elk.

A second small game device is shown in U.S. Pat. No. 3,674,188, that issued on Jul. 4, 1972 to Anderson, in which there is disclosed a sack like device with a water-impervious liner bag having perforations for water and other liquids to drain from the bag. This bag is also not designed to carry large game.

A fourth device is shown in design patent 356,948, that issued Apr. 4, 1995 to Nahatchewitz. This device appears to be a bag that has a small opening at the top to allow the insertion of game.

There is a device that is advertised in Cabela's catalog (1999-2005) that is identified as a "Deer Sleigh'r that appears to be a plastic sled that can carry large game.

None of the aforementioned devices are analogous to the device of the instant invention, and none of the references anticipate or make obvious the instant invention.

THE INVENTION

The invention disclosed and claimed herein deals with a device for hauling or moving game.

With more specificity, a first embodiment of the invention deals with a device that comprises a flat sheet of puncture resistant fabric having a top edge, a bottom edge, two essentially parallel side edges, a front side and a back side.

The bottom edge and both side edges have a fold of the fabric back unto the fabric itself, forming two layers and as formed, they are secured together. The top edge also has a fold of the fabric back unto the fabric such that a sleeve is formed, the sleeve having a near end and a distal end.

There is located within the sleeve, a pull strap, the pull strap having a near end and a distal end, wherein the distal end is securely attached to a pull string. The pull string is long enough to extend from the distal end of the pull strap to a point outside of the distal end of the sleeve when the flat sheet is laying flat. The near end of the pull strap has a handle attached to it, the handle being located in the near end of the sleeve.

The flat sheet of fabric has a glossy slick finish on the front side and a water resistant coating on the back side.

The flat sheet of fabric has a closure means near the top edge comprising a strip containing small loops located and attached on the back side surface of the fabric and a corresponding strip containing small hooks that stick to such loops, being located on and attached to the front surface of the fabric.

A second embodiment of this invention is a combination of the device of this invention in a folded condition and inserted in a fabric container for carrying and storing.

The device, and the combination of this invention is quick and easy to use and is easy to store. It is exceptionally easy to carry because it is lightweight.

DETAILED DESCRIPTION OF THE INVENTION

Figures 1, 5:
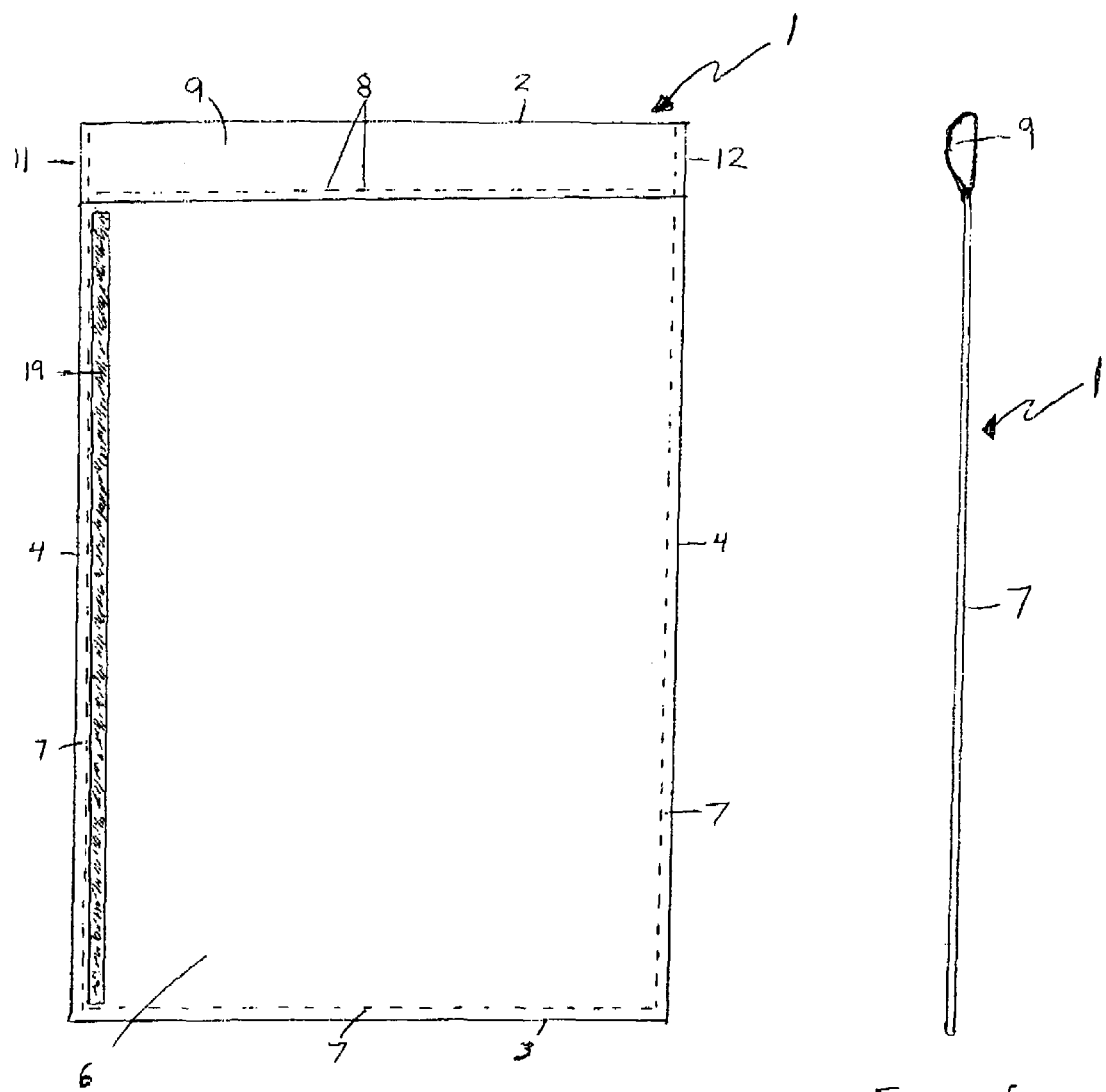
FIG. 1 is a full back view of the device of this invention.
FIG. 5 is a full side view of the device of this invention.

Turning now to the Figures, and with reference to FIG. 1, which is a full back view of a device 1 of this invention, which is a flat fabric in a fully laid out, flat position.

There is shown the top edge 2, the bottom edge 3, the side edges 4, the back surface 6, folds 7, and the securing means, in this case stitching 8. The securing means can also be, for example, gluing, stapling, and the like. Stitching is the most convenient means of securing the folds.

The folds 7 are a means of providing an even edge 4, a means of providing strength and a stable dimension to the fabric, and a means of preventing fraying of the edges 4. The folds 7 are not large, in that, it is only necessary to make them as large as is needed to prevent the fraying mentioned Supra.

Figure 3:
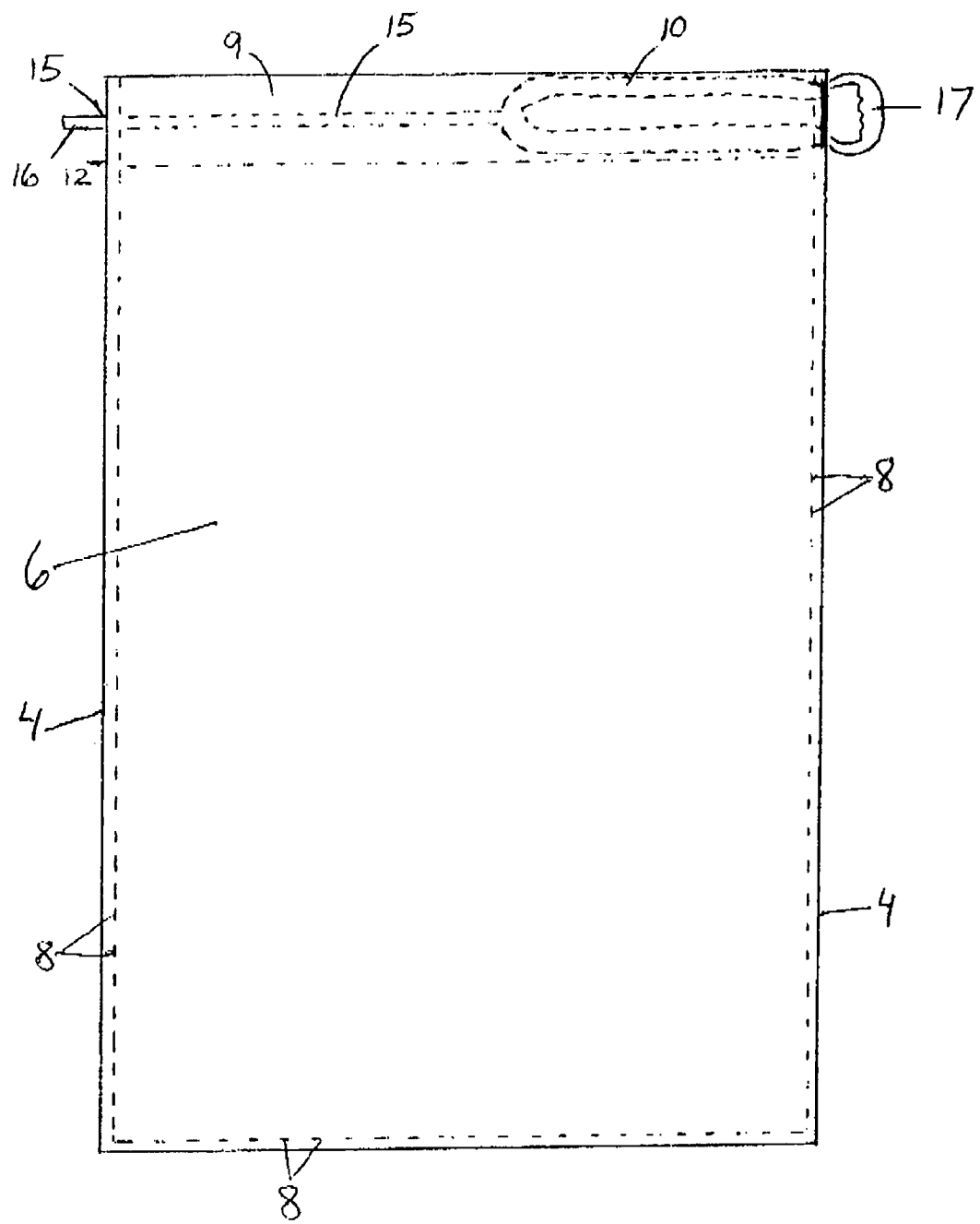
FIG. 3 is a full front view of the device of this invention showing the pulling apparatus in phantom within the fold.
Figure 4:
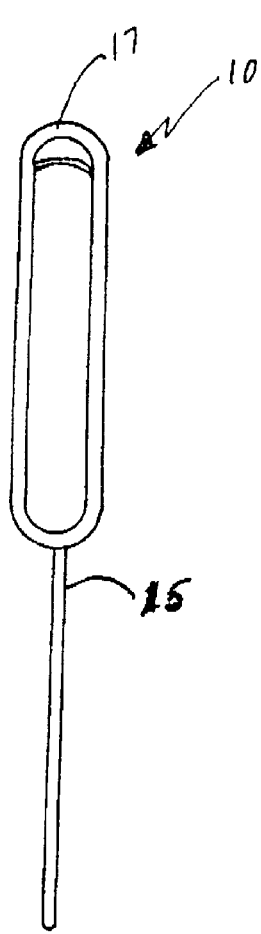
FIG. 4 is an enlarged full top view of the pulling apparatus of this invention.

The top edge 2 has a fold 9 of the fabric unto itself, except, in this case, the fold is larger to accommodate the pull strap 10, discussed infra. As with the folds 7, fold 9 is secured by, in this case, stitching 8, however, the securing means may be the same as used for folds 7. The fold 9 forms a sleeve that must be large enough to loosely hold the pull strap 10 (FIGS. 3, 4 and 5). The fold 9 has a near end 11 and a distal end 12.

With reference to FIGS. 3 and 4, there is shown the pull strap 10 attached to a pull string 20 assembly within the fold 9 (all in phantom in FIG. 3). Regarding FIG. 4, the pull strap 10 has a near end 13 and a distal end 14, and the distal end 14 has securely attached thereto, a pull string 15. The pull string 15 is long enough that it can extend from the distal end 14 of the pull strap 10 to a point 16 outside of the distal end 12 of the fold 9, measured when the fabric is laying out in a flattened position.

The near end 13 of the pull strap 10 has a pull handle 17 attached thereto, the necessity of which is set forth infra. As shown in FIG. 3 in phantom, the pull strap 10 lays fully within the fold 9, and the pull handle 17 sits just into the fold 9. During storage, the pull handle 17 sits on the outside, near the fold 9.

The flat sheet of fabric has a glossy slick finish on the front side 5. The glossy slick finish is a result of the fabric from which the device 1 is manufactured. This fabric is a puncture resistant, as opposed to a puncture proof, fabric, and is commercially available as a polyester fabric, or a nylon fabric. The commercial material can be for example, rip stop nylon, or polyester, manufactured in various camouflage. The fabric has a denier of from about 75 to about 200 and can be of any color, however, for hunting and other outdoor purposes, the color should be dark or hunter's orange, and especially preferred is camouflaged colors, such as Trebark®, manufactured by Haas Outdoors, Inc. Corporation Mississippi, P.O. Box 757, West Point, Miss. 39773, Mossy Oak®, manufactured by Mossy Oak Apparel Company, 3330 Cumberland Boulevard, Suite 600, Atlanta Ga. 30339, and Real Tree®, manufactured by Jordan Outdoor Enterprises, Ltd., 1390 Box Circle, Columbus, Ga. 31907, and the like. Also preferred is hunter's orange for use by rifle deer hunters.

The main reason for the glossy slick finish on the front side 5 is that it facilitates the movement of the game by being slippery against the ground. Normally, a fully grown deer will weigh in the neighborhood of about 150 pounds and this amount of weight when dragged along the ground is a full effort for an adult person. Using the device of this invention, the 150 pound deer can be dragged along the ground by a person that is of slight build, and even younger, smaller persons can move game using this device.

Figure 2:
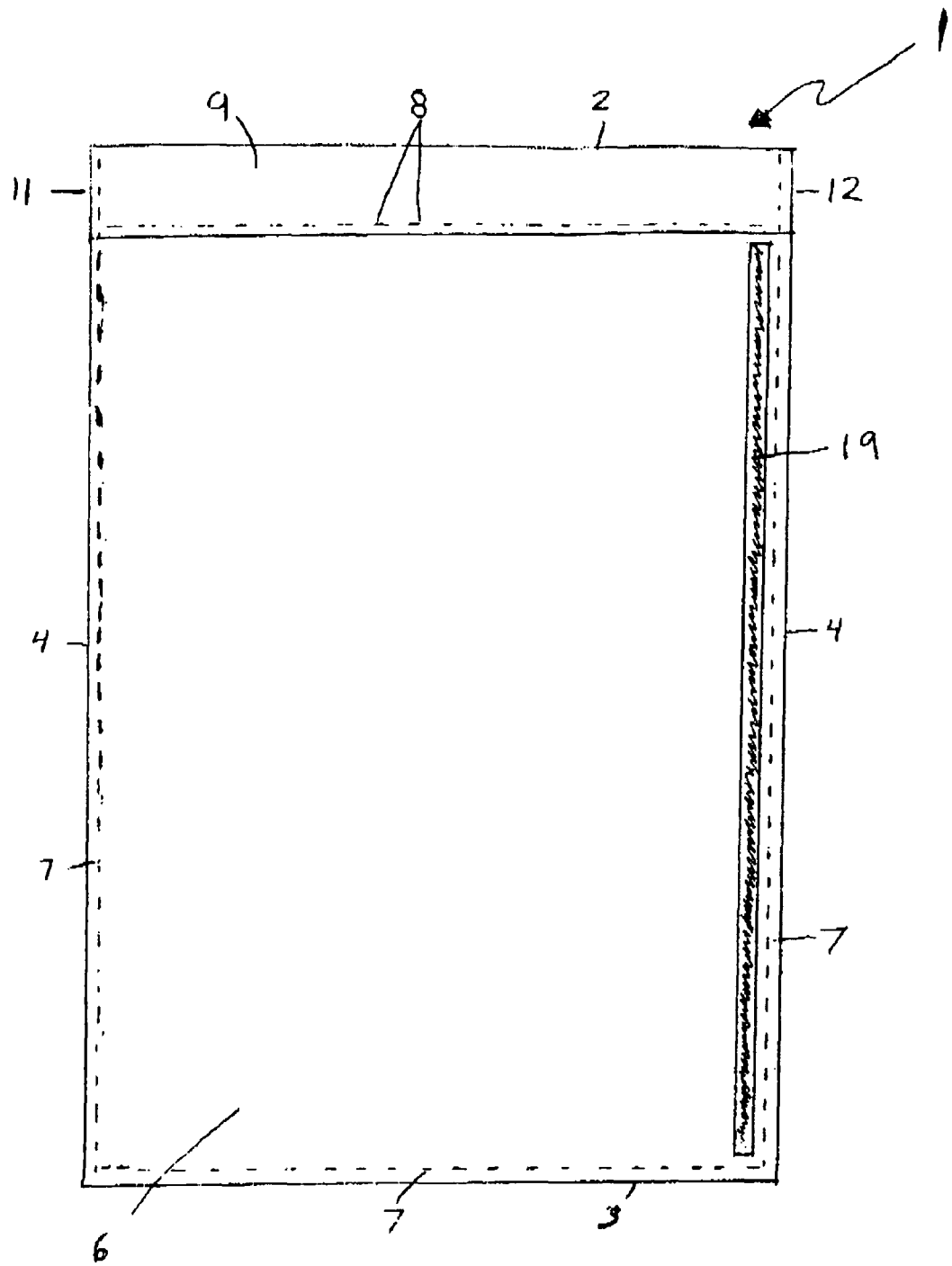
FIG. 2 is a full front view of the device of this invention.

Also shown in FIG. 1 is ½ of the securing means of this invention in that there is shown a Velcro® strip and in this Figure, this ½ strip 18 is the looped portion of the Velcro. The corresponding securing strip 19 contains the hook portion of the Velcro, and is attached to, and located on the front surface 5 as shown in FIG. 2.

The back side 6 of the fabric has a water resistant coating on it. One reason for the water resistant coating is that blood and other fluids from the game will be contained within the fabric when it is enclosed around the game.

In addition, this device can be used as a temporary hunting blind, or a rain coat, or for a body wrap for retaining body heat.

The fabric of the device is machine washable, but must be line dried only.

The device, even with the pulling apparatus is completely foldable into a very small size. Thus, there is a second embodiment of this invention, which is a combination of the folded device in a container. The container is a fabric bag 21, that is generally manufactured from the same fabric as the device and into which the folded device will fit completely.

Figure 6:
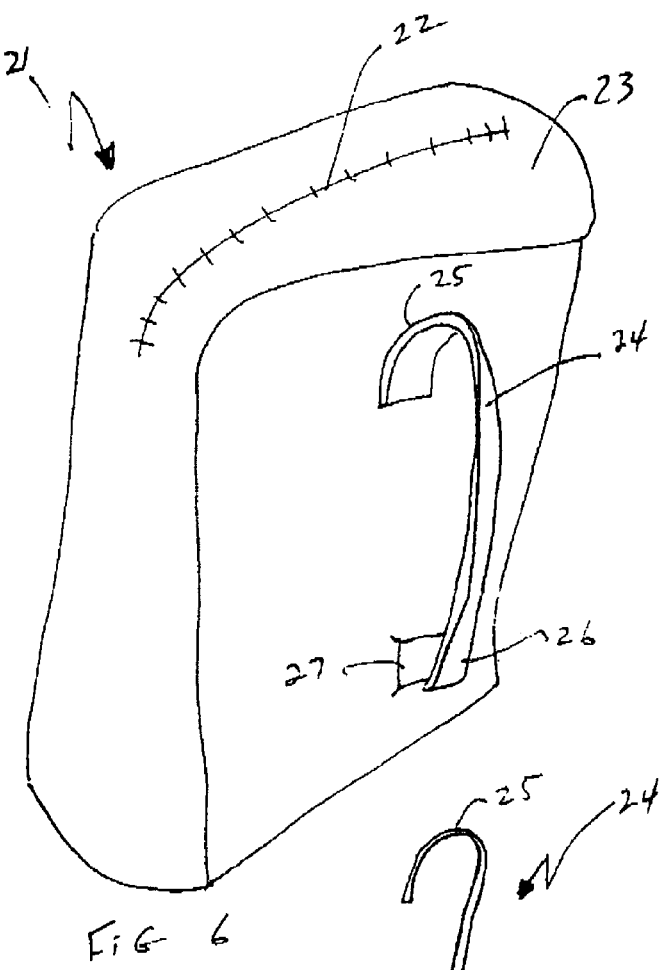
FIG. 6 is a view in perspective of the bag of this invention.
Figure 7:
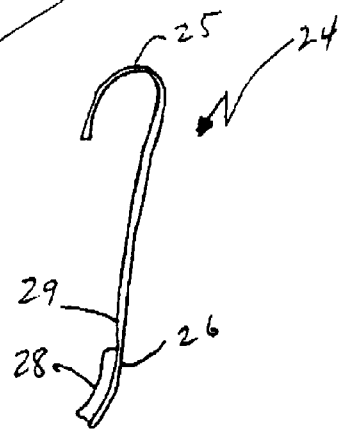
FIG. 7 is a full side view of the looped belt of this invention.

The bag is shown in FIG. 6. The bag 21 has a zipper 22 in the top 23. The bag 21 also has a looped belt 24, that has a top end 25 and a bottom end 26. The top end 25 is securely fastened to the back 26 of the bag 21 and the bottom end 26 is fastened using the same type of securing means as is used for the device itself wherein a ½ of a Velcro strip 27 is attached to the back 26 of the bag 21, and the other ½ of the Velcro strip 28, is attached to the inside surface 29 of the bottom end 26. By this means, the bag 21 can be attached and released from the belt of a person without having the person remove his or her belt.

In use, after the game is field dressed, the device is removed from the carrying bag and unfolded to its greatest extent and laid on the ground with the front surface down, that is the water resistant side facing upwardly.

The game is placed in the center of the device, with the head of the game at the fold 9 end. The pull string is pulled to move the fold together and scrunch it up until the pull strap comes into view. The handle of the pull strap is inserted through the pull strap to tighten it around the game neck. Then, the Velcro strips are meshed together at the head.

The game is ready for movement. This is accomplished by pulling on the handle, either using the handle directly, or attaching a tow rope to the handle, and dragging the device containing the game along the ground like a sled or toboggan. Because of the glossy finish of the front side, this is easily accomplished.

When the device containing the game is ready for loading into a vehicle, the opposite end of the device from the fold 9 is wrapped around the legs of the game and tied with a rope or strap. By this means, the blood or other liquids draining from the game is held in the device until the game is unloaded. It is within the scope of this invention to use the device, spread out on the floor underneath the game as a drop cloth to catch any blood or other liquids that drain from the game.

After use, the device is washed, dried, folded, and returned to the bag for storage.

What is claimed is:

1. A device for moving game, the device comprising:
    a flat sheet of puncture resistant fabric having a top edge, a bottom edge, two essentially parallel side edges, a front side, and a back side; wherein the fabric has a glossy slick finish on the front side and a water resistant coating on the back side; wherein the fabric is folded over onto and secured to itself along the bottom edge and both side edges; and wherein the fabric is folded over onto and secured to itself along the top edge such that a sleeve is formed along the top edge, the sleeve having a near end and a distal end;
    securing means for securing the front side of the sheet to the back side of the sheet, wherein the securing means includes a strip of hook fasteners on the front side of the sheet and a strip of loop fasteners on the back side of the sheet;
    a pull strap located within the sleeve; wherein the pull strap is in the form of a loop having a near end and a distal end; wherein the distal end of the pull strap is located within the sleeve between the near end and distal of the sleeve; and wherein the near end of the pull strap is located proximate the near end of the sleeve;
    a handle attached to the near end of the pull strap; wherein the handle protrudes from the near end of the sleeve when the sheet is laying flat, and
    a pull string attached to the distal end of the pull strap; wherein the pull string extends from the distal end of the pull strap and protrudes out of the distal end of the sleeve when the sheet is laying flat;
    wherein after the game is placed onto the sheet with its head positioned over the sleeve, a user can pull on the pull string in order to pull the distal end of the pull strap out of the distal end of the sleeve as the sleeve becomes scrunched, at which point the user can insert the handle and near end of the pull strap through the distal end of the pull strap to tighten the pull strap around the neck of the game and use the handle to drag the game along the ground.

2. A device as claimed in claim 1 wherein the fabric is polyester.

3. A device as claimed in claim 1 wherein the fabric is nylon.

4. A device as claimed in claim 1 wherein the fabric has a camouflage coloring.

5. A device as claimed in claim 1 wherein the fabric has a hunter's orange coloring.

6. A device as claimed in claim 1 further comprising a container in which the device can be carried in a folded condition.

7. A device as claimed in claim 6 wherein the container has a belt attached thereto.

8. A device as claimed in claim 6 wherein the container has a top zipper for closure.

* * * * *